(12) United States Patent
Shimizu et al.

(10) Patent No.: US 6,580,447 B2
(45) Date of Patent: Jun. 17, 2003

(54) VIDEO SIGNAL SWITCHING ARRANGEMENT AND CONFERENCE VIDEO DISPLAY SYSTEM USING SAME

(75) Inventors: Kazuo Shimizu, Shizuoka-ken (JP);
Satoshi Kawaguchi, Shizuoka-ken (JP);
Kouji Takahashi, Shizuoka-ken (JP);
Shinichi Furukawa, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/893,907

(22) Filed: Jun. 29, 2001

(65) Prior Publication Data

US 2002/0018116 A1 Feb. 14, 2002

(30) Foreign Application Priority Data

Jun. 30, 2000 (JP) ........................... 2000-199798
Jun. 27, 2001 (JP) ........................... 2001-195307

(51) Int. Cl.⁷ .................................................. H04N 7/14
(52) U.S. Cl. .............................. 348/14.11; 348/14.08; 348/705
(58) Field of Search ..................... 348/14.11, 14.01, 348/14.02, 14.04, 14.05, 14.07, 14.08, 14.09, 705, 706; 379/93.09, 93.11, 93.17

(56) References Cited

U.S. PATENT DOCUMENTS 6,215,781 B1 * 4/2001 Kato et al. .................. 348/705

FOREIGN PATENT DOCUMENTS

| FR | 2575611 A | * 7/1986 | ........... H01R/25/00 |
| JP | 3050205 | 4/1998 | |

* cited by examiner

Primary Examiner—Melur Ramakrishnaiah
(74) Attorney, Agent, or Firm—Finnegan, Henderson, Farabow, Garrett & Dunner, L.L.P.

(57) ABSTRACT

A conference video display system is provided for allowing attendees at the conference to switch to the video images of their respective personal computers at will, and eliminating the need for determining the correlation between the personal computers and channels of a switching unit, to provide facilitated and appropriate video switching.

The system has a switching unit for receiving a plurality of video signals and selectively outputting the received video signals, and a plurality of connection cables for connecting the switching unit and a plurality of personal computers. Each of the connection cables has a selection request switch near the personal computer connected thereto to make the switching unit select the video signal from the connected personal computer as an output video signal thereof.

8 Claims, 4 Drawing Sheets

VIDEO SIGNAL SWITCHING ARRANGEMENT AND CONFERENCE VIDEO DISPLAY SYSTEM USING SAME

BACKGROUND OF THE INVENTION

1. Field of the Invention

This invention relates to a video signal switching arrangement for use in a conference to select a video signal from the video signals sent from a plurality of personal computers and projecting the video image of the selected signal; and a conference video display system using same.

2. Description of the Related Art

With the prevalence of personal computers and projectors, conference style has changed from one in which all presenters share a single personal computer and a projector, to one in which a plurality of personal computers and a projector are used. More specifically, conference attendees use their respective personal computers and project video images from the computers selectively.

FIG. 1 shows a conventional video signal switching unit 50 having a plurality of video input connectors 51 for receiving a plurality of video signals, a plurality of switches 52 for selecting one of the video signals inputted, a video output connector 53 for outputting the video signal selected via one of the switches 52, and a power switch 54 for turning the power of the switching unit on/off. With the video signal switching unit 50 of this structure, a conference video display system is established, as shown in FIG. 2, by connecting a plurality of personal computers 55 to the video input connectors 51 of the video signal switching unit 50 via video signal cables 56, and connecting the video output connector 53 of the video signal switching unit 50 to a projector 57 via a video signal cable 58.

In this conference video signal switching system, a person near the video signal switching unit 50 activates one of the switches 52 to selectively project a video image provided by the personal computer 55 desired with the projector 57.

Alternately, a remote controller may be used to perform the switching of the video signal switching unit 50. A related art to the video signal switching unit 50 is disclosed in Japanese Utility Patent No. 3050205.

SUMMARY OF THE INVENTION

In the above conventional video signal switching unit 50, however, a person present at the conference who can select video images is limited to the one near the switching unit 50 or a presenter, for example. When the personal computers 55 and the video signal switching unit 50 are randomly connected via the video signal cables 56, it is necessary to examine the correlation in connection between the personal computers 55 and the switches 52 of the video signal switching unit 50, preventing smooth and appropriate video image selection. In particular, when the video signal cables 56 are located within tables or under the floor, it becomes difficult to examine the correlation in connection between the personal computers 55 and the switches 52 of the video signal switching unit 50.

This invention is made to solve the above problem and has an object of providing a video signal switching arrangement which enables attendees at the conference to switch to the video images of their respective personal computers by themselves at will, and provides facilitated and appropriate video image selection without requiring correspondence between the personal computers and the switches in connection, and a conference video display system using the same.

According to a first aspect of the invention, there is provided a video signal switching arrangement having a switching unit for receiving a plurality of video signals and selectively outputting one of the received video signals and a plurality of connection cables for connecting the switching unit to a plurality of personal computers each having a switch, a first cable extending from the switch and being connected at one end thereof to a video signal output of one of the personal computers, and a second cable extending from the switch and being connected to the switching unit at one end thereof, wherein the switch outputs a signal to the switching unit via the second cable to make the switching unit select a video signal sent from the personal computer connected to the switch as the output video signal thereof.

According to a second aspect of the invention, the switch receives a signal for indicating the selection of the personal computer connected thereto when selected, via the second cable; and the switch has an indicator for indicating the selection of the personal computer in response to the received signal.

According to a third aspect of the invention, the second cable has at least one core wire for transmitting a video signal and at least one core wire for transmitting a selection signal.

According to a fourth aspect of the invention, there is provided a connection cable for transmitting a video signal from one end to another end thereof and transmitting an additional signal, comprising first cable for receiving the video signal at one end thereof, a second cable for outputting the video signal and the additional signal from one end thereof, and an additional signal generator including a switch having two statuses for outputting a status signal and an indicator operated based on a signal responding to the status signal, wherein the second cable includes at least one core wire for outputting the status signal and at least one core wire for receiving the signal in response to the status signal.

According to a fifth aspect of the invention, there is provided a conference video display system for selecting an output video signal from video signals sent from a plurality of personal computers, and outputting the output video signal selected to a display device, having a switching unit for receiving a plurality of video signals and selectively outputting one of the received video signals and a plurality of connection cables for connecting the switching unit to the personal computers and outputting video signals from the personal computers to the switching unit each having a switch located near to the personal computer connected thereto to make the switching unit select the video signal sent from the personal computer connected thereto as an output video signal therefrom.

BRIEF DESCRIPTION OF THE ACCOMPANYING DRAWINGS

The above and further objects and novel features of this invention will more fully appear from the following detailed description when the same Is read in conjunction with the accompanying drawings, in which.

DETAILED DESCRIPTION OF THE PREFERRED EMBODIMENT

With reference to the accompanying drawings, a preferred embodiment of this invention will now be described.

Figure 1:
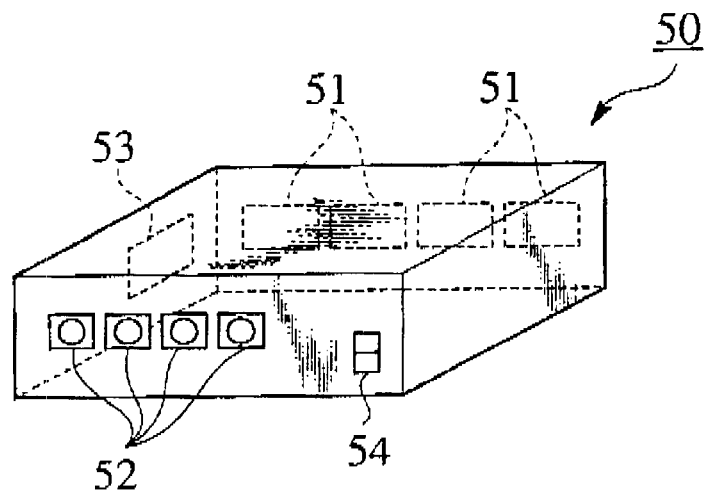
FIG. 1 is a perspective view of a conventional video signal switching unit.
Figure 2:
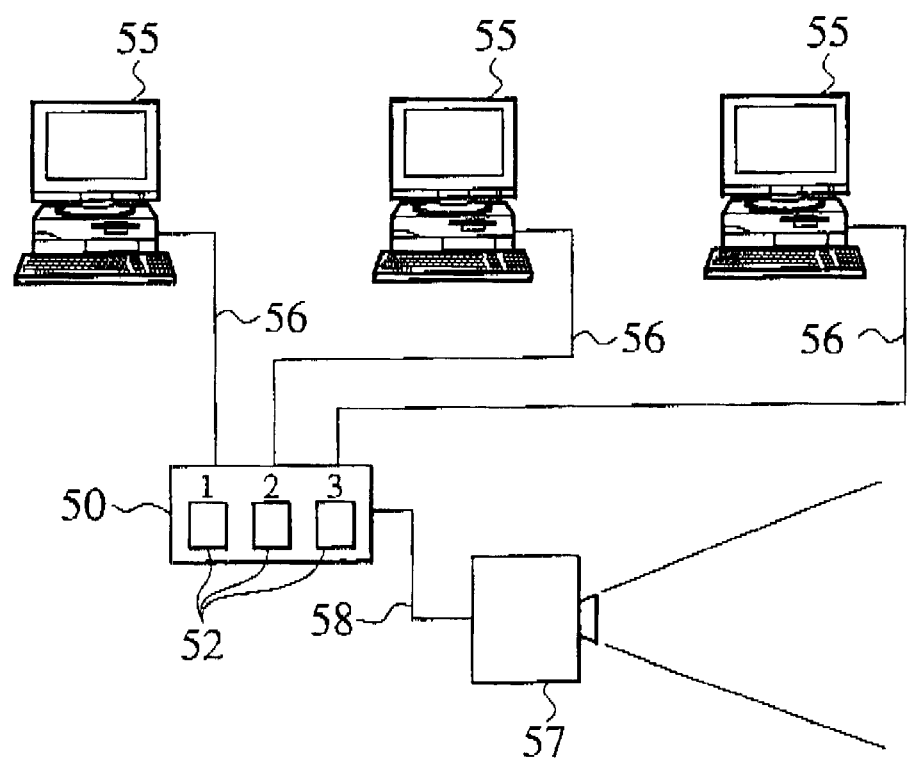
FIG. 2 is a block diagram of a conventional conference video display system.
Figure 3A:
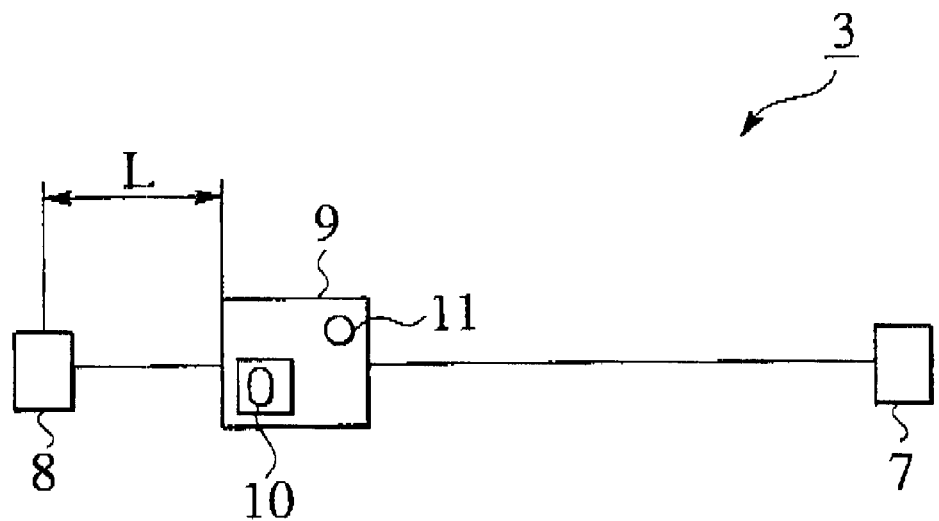
FIG. 3A is a block diagram of a connection cable according to an embodiment of this invention.
Figure 3B:
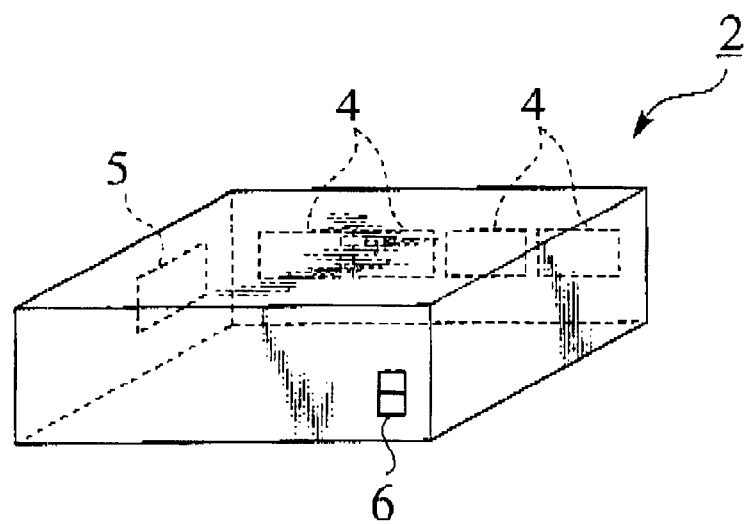
FIG. 3B is a perspective view of a switching unit according to the embodiment of the invention.
Figure 5:
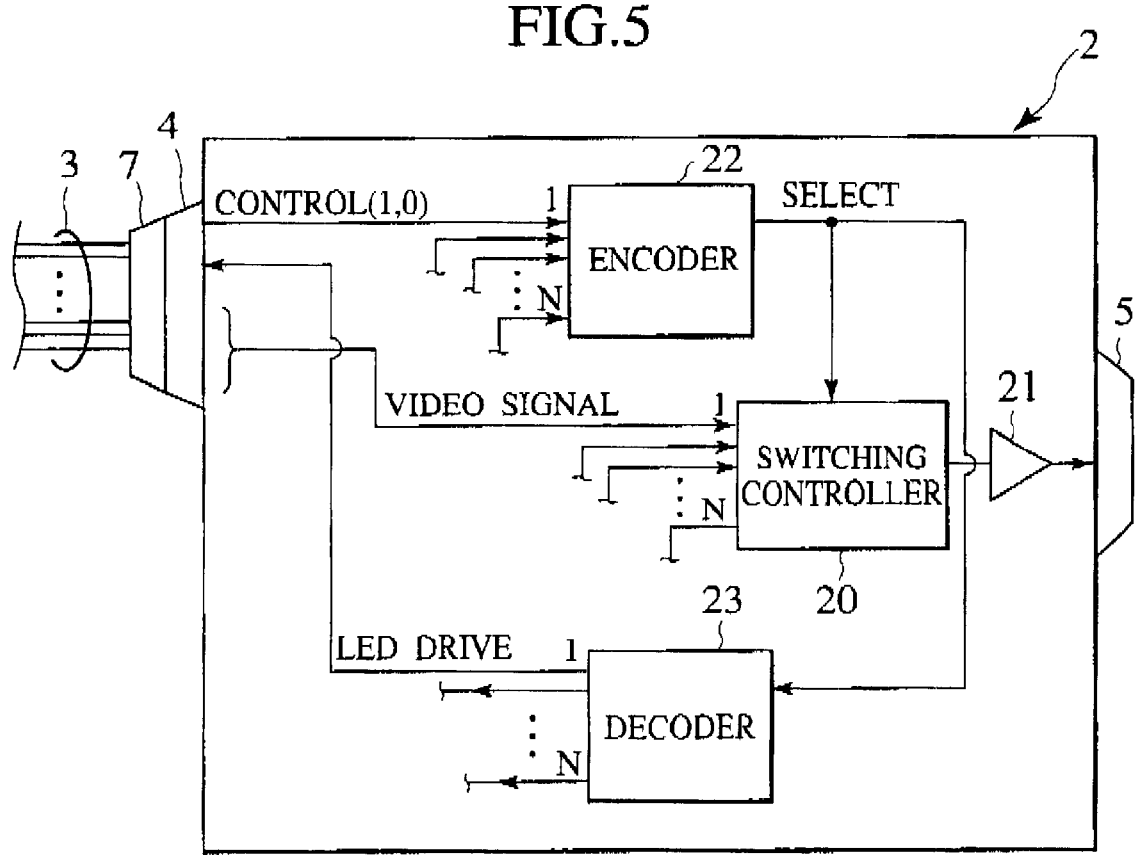
FIG. 5 is a circuit diagram of the switching unit according to the embodiment of the invention.

A video signal switching arrangement of this embodiment has a switching unit 2 and a plurality of connection cables 3, The switching unit 2 has, as shown in FIGS. 3B and 5, a plurality of input connectors 4 for receiving a plurality of video signals, a switching controller 20 for receiving the video signals from the input connectors 4 and selecting one of the video signals inputted, a video output connector 5 for outputting the video signal selected by the switching controller 20 through a video amplifier 21, and a power switch 6 for turning the power of the switching unit on/off. The switching unit 2 also has an encoder 22 for receiving switching control signals from the input connectors 4. Upon input of a switching control signal for one of the video signals, the encoder 22 generates a selection signal (three-bit signal, for example) for specifying the input connector 4 outputting the switching signal, that is, the corresponding channel (1–N), and outputs the selection signal to the switching controller 20 and a decoder 23. The decoder 23 outputs a indicator drive signal or control signal to the corresponding connector 4 in response to the selection signal. The switching controller 20 outputs the video signal selected in response to the selection signal as an output signal. More specifically, the switching controller 20 is adapted to select as an output video signal the video signal that was input from the input connector 4 outputting the switching signal, where the switching signal is the latest one sent from one of a plurality of selection request switches, to be described later.

Figure 4:
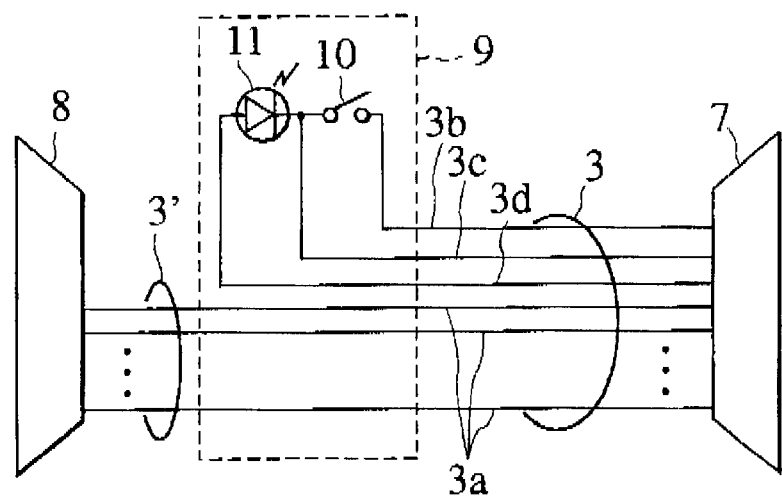
FIG. 4 is a circuit diagram of the connection cable according to the embodiment of the invention.

Each of the connection cables 3 has, as shown in FIGS. 3A and 4, a switching unit side connector 7 at one end thereof and a personal computer side connector 8 at the other end, to connect the switching unit 2 to a personal computer (not shown) with the connectors 7 and 8. A selection request switch 9 is provided on the connection cable 3 at a close distance L from the personal computer side connector 8. The distance L is preferably set at 1 m or less and more preferably at 10 cm to 50 cm. The connection cable 3 has a length for connecting the personal computer to the selection request switch 9, as a first connection cable, and a length for connecting the switching unit 2 to the selection request switch 9, as a second connection cable. The first connection cable has a length that is shorter than the length of the second connection cable, so that the selection request switch is arranged closer to the personal computer and can be operated by the user of the personal computer by hand. The first connection cable has a length preferably of 2 m or less, and more preferably of 1 m or less.

The selection request switch 9 has a switching button 10 for outputting a switching control signal to request selection of a video signal of the personal computer (not shown) connected to the connection cable 3, and an indicator (light-emitting element such as an LED) 11 for indicating the personal computer selected. The switching button 10 may provide a selection request to the encoder 22 of the switching unit 2 directly through the on/off of the switch, or via a logical status signal generated by an electronic element such as a transistor added to the switch, corresponding to the on/off of the switch.

The switching controller 20 may select a video signal in response to the input of a switching control signal, or, alternatively, may set selection priorities based on a prescribed rule and select the video signal based on these priorities. Further, in order to prevent frequent switching, a controlling rule may be set to reject new switching for a fixed time period after each switching operation.

When a controlling rule is set, it is preferred that a signal specifying the selected channel from the switching controller 20, instead of an output from the encoder 22, be outputted to the decoder 23. The signal produced by the decoder 23 reflects the status signal generated by the selection request switch 9. This allows the selection request switch 9 of each connection cable 3 to determine whether the video signal inputted to the connection cable is selected or not in a correct and facilitated manner.

The connection cable 3 has, as shown in FIG. 4, core wires 3a (3') for video signals, core wires 3b and 3c for switching video signals, and a core wire 3d for controlling the indicator. Through the core wires 3a for video signals, a video signal from the personal computer (not shown) connected thereto is supplied to the switching unit 2. Through the core wires 3b and 3c for switching video signals, a switching signal from the switching button 10 is supplied to the switching unit 2. Through the core wires 3b and 3c, voltage or electric current supplied from the switching unit 2 to the indicator 11 of the selection request switch 9 is controlled.

In the switching unit 2, the combination of the encoder 22 and the decoder 23 specifies which input connector 4 outputs the switching controlling signal generated by the activation of the switch button 10. Accordingly, even if the connection cables 3 are connected to the input connectors 4 randomly, it is possible to send a control signal having at least two statuses reflecting the related switching control signal for confirming the selection to the appropriate input connector 4. More specifically, the connection cable 3 has the core wires 3a for video signals, the core wires 3b and 3c for switching video signals and the core wire 3d for controlling the indicator, so that if the connection cable 3 is connected to any input connector 4, the switching unit 2 can determine the input connector 4 to control the indicator appropriately. Accordingly, it is not necessary to consider the correlation in connection between the connection cables 3 and the input connectors 4, eliminating erroneous determination of the correlation in connection, resulting in high reliability. Such a selection confirming function can also be used to check the core wires of the connection cables and the connection between the connection cables and the input connectors 4 for any errors.

With the above structure, a personal computer (not shown) and one of the input connectors 4 of the switching unit 2 are connected via the connection cable 3, and the video output connector 5 of the switching unit 2 and a display means (not shown) are connected via a video signal cable (not shown), thereby establishing a conference video display system. Accordingly, with the video signal switching arrangement, the user of each personal computer (not shown) activates the selection request switch 9 of the connection cable 3 connected to the computer, being positioned near the computer, to switch the output video signal of the switching unit 2 to that of the video image of the computer.

According to this embodiment, each attendee at the conference can individually and selectively connect a video signal outputted from his or her personal computer to the display device such as a projector, and can make a presentation at his or her place. Each attendee at the conference can switch to the appropriate video signal without considering the correlation in connection between the connection cable and the switching unit, which enables the smooth procedure of the conference.

For the connection between the switching unit side connectors 7 of the connection cables 3 and the input connectors 4 of the switching unit 2, it is not necessary for each attendee to check the correlation in connection between the personal computers 13 and the switching unit 2, so that the connectors 7 can be fitted into any available input connectors 4 to complete the connecting operation, facilitating the connecting operation.

Especially when the connection cables 3 are located within tables or under the floor, it is not necessary to examine the correlation between the personal computers 13 and the input connectors 4 of the switching unit 2, which significantly improves workability in wiring. For example, when priorities are set in accordance with the positions of attendees at the conference, it is only required to check the relationship in connection between the connection cables corresponding to the positions and the switching unit. More specifically, as long as the attendees at the conference connect their personal computers to the connection cables corresponding to their respective positions, it is not necessary to physically inspect or check the relationship in connection between the individual personal computers and the switching unit.

When it is desired to verify that the personal computer 13 is connected to a specific input connector 4 for setting priorities, an examining operation such as instructing a user of the computer to push the switching button 10 for determination can be performed before the start of the conference. In such a case, it is preferred that the switching controller 20 have a storage means (not shown) for storing the correlation between users of the personal computers and channels of the encoder 22 required for the rule for setting priorities.

In this embodiment, the selection request switch 9 has a switching button 10 and an indicator 11 for indicating the selection of the personal computer (not shown), so that a push of the switching button 10 illuminates or flashes the indicator 11, for example, through the control of the switching unit 2 when the personal computer is selected. Accordingly, the attendees at the conference can visually identify the source of the video image selected by the switching unit 2 and the attendee selected is made aware of this fact. If the activation of the switching button 10 does not make the personal computer selected under the controlling rule such as priorities, the attendee is made aware of this fact. In such a case, it is possible to provide an indication of the rejection of selection (by quick flashing, for example).

In this embodiment, the connection cable 3 has the core wires 3a for transmitting video signals and core wires 3b and 3c for transmitting switching control signals for switching video signals, so that the single connection cable 3 for connecting a personal computer and the switching unit 2 can transmit both video signals and switching signals of the video signals, and supply power for operating the selection request switch 9 from the switching unit 2.

Figure 6:
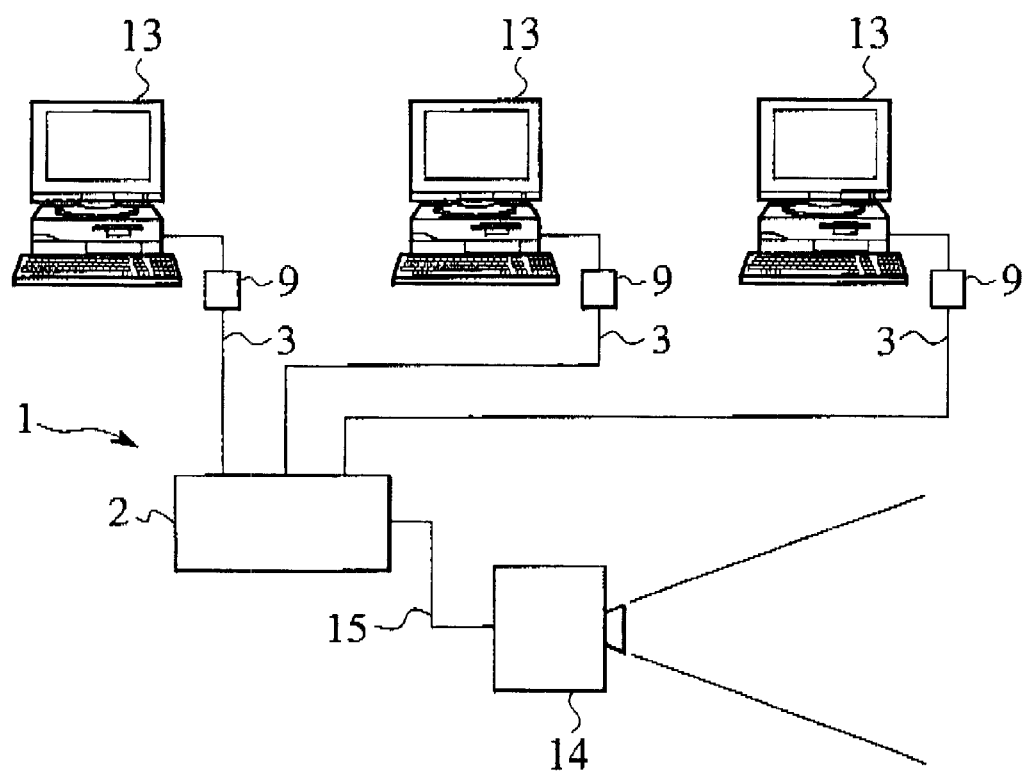
FIG. 6 is a block diagram of a conference video display system according to an embodiment of the invention.

Now an example of a conference video display system established with the video signal switching arrangement 1 of the above structure will be described with respect to FIG. 6. In FIG. 6, the conference video display system has three personal computers 13, three connection cables 3, a switching unit 2, a projector 14 as a display means, and a video signal cable 15 for connecting the switching unit 2 to the projector 14. Video output connectors (not shown) of the computers 13 and input connectors (not shown) of the switching unit 2 are connected via the respective connection cables, and a video output connector (not shown) of the switching unit 2 and the projector 14 are connected via the video signal cable 15.

In the conference video display system according to the above structure, a user of one of the personal computers 13 operates the selection request switch 9 of the connection cable 3 connected to the computer, being positioned close to the computer, to switch to the video signal of the personal computer 13, thereby projecting the video Image of the video signal using the projector.

According to this embodiment, attendees at the conference can selectively connect video signals outputted from the respective personal computers to the display device, being able to make presentations from their places. The attendees at the conference do not need to consider the connection relationship between the connection cables and the switching unit and can switch to the appropriate video signal, enabling the smooth procedure of the conference.

In the above embodiment, a single switching unit 2 is used to establish the conference video display system. It is further possible to increase the number of connectable personal computers 13, using two or more switching units 2. In this case, an output 5 of one switching unit 2 is connected to an input connector 4 of another switching unit 2.

In the above embodiment, the projector 14 constitutes the display device. The display device can be of any sort as long as it is able to project the video image of the video signal selected.

The entire content of a Japanese Patent Applications No. 2000-199798, filed on Jun. 30, 2000 and 2001-195307, filed on Jun. 27, 2001 are hereby incorporated by reference. While embodiments of the present invention have been described using specific terms, such description is for illustrative purposes, and it is to be understood that changes and variations may be made without departing from the scope of the following claims.

What is claimed is:

1. A video signal switching arrangement comprising:
    a switching unit for receiving a plurality of video signals and selectively outputting one of the received video signals; and
    a plurality of connection cables for connecting the switching unit to a plurality of personal computers, each of the connection cables having a separate switch, a first cable extending from the switch and being connected at one end thereof to a video signal output of one of the personal computers, and a second cable extending from the switch and being connected to the switching unit at one end thereof, wherein the switch outputs a signal to the switching unit via the second cable to make the switching unit select a video signal sent from the personal computer connected to the switch as the output video signal thereof.

2. A video signal switching arrangement as set forth in claim 1, wherein:
    each switch receives a signal for indicating the selection of the personal computer connected thereto when selected, via the second cable; and each switch has an indicator for indicating the selection of the personal computer in response to the received signal.

3. A video signal switching arrangement as set forth in claim 1, wherein each switch is arranged close to the personal computer connected thereto.

4. A connection cable connected to a switching unit for receiving a plurality of video signals and selectively outputting one of the received video signals, the connection cable comprising:
   a switch;
   a first cable extending from the switch and being connected to a video signal source at one end thereof; and
   a second cable extending from the switch and being connected to the switching unit at one end thereof, wherein
   the switch outputs a signal to the switching unit via the second cable to make the switching unit select one of the received video signals as an output video signal thereof; and
   the first cable has a length shorter than that of the second cable.

5. A connection cable connected to a video switching unit for selecting one video signal from video signals sent from a plurality of personal computers, comprising:
   a switch;
   a first cable extending from the switch, one end of the first cable being connected to a video signal output of one of the personal computers; and
   a second cable extending from the switch, one end of the second cable being connected to the video switching unit, wherein
   the switch outputs a signal to the video switching unit via the second cable to make the video switching unit select a video signal sent from the personal computer connected thereto as an output video signal of the video switching unit; and
   the second cable has at least one core wire for transmitting a video signal and at least one core wire for transmitting a selection signal.

6. A connection cable for transmitting a video signal from one end to another end thereof and transmitting an additional signal, comprising:
   a first cable for receiving the video signal at one end thereof;
   a second cable for outputting the video signal and the additional signal from one end thereof; and
   an additional signal generator, the generator including a switch having two statuses for outputting a status signal and an indicator operated based on a signal responding to the status signal, wherein
   the second cable extends from the generator and includes at least one core wire for outputting the status signal and at least one core wire for receiving the signal in response to the status signal.

7. A conference video display system for selecting an output video signal from video signals sent from a plurality of personal computers, and outputting the output video signal selected to a display device, comprising:
   a switching unit for receiving the video signals from the personal computers and selectively outputting one of the received video signals; and
   a plurality of connection cables for connecting the switching unit to the personal computers and outputting the video signals from the personal computers to the switching unit, each of the connection cables having a separate switch located near the personal computer connected thereto to make the switching unit select the video signal sent from the personal computer connected to the switch as the output video signal from the switching unit.

8. A conference video display system as set forth in claim 7 wherein:
   each switch receives a signal for indicating the selection of the personal computer connected thereto when selected, from the switching unit via the connection cable; and
   each switch has an indicator for indicating the selection of the personal computer in response to the received signal.

* * * * *